US012785403B2

(12) United States Patent
Shu et al.

(10) Patent No.: US 12,785,403 B2
(45) Date of Patent: Nov. 3, 2026

(54) COORDINATED OPTIMIZATION METHOD FOR VSC-HVDC FREQUENCY SYNCHRONIZATION CONTROL AND HYDRO POWER PRIMARY FREQUENCY REGULATION

(71) Applicant: Kunming University of Science and Technology, Kunming (CN)

(72) Inventors: Hongchun Shu, Kunming (CN); Zongxue Shao, Kunming (CN); Guangxue Wang, Kunming (CN); Tingyi He, Kunming (CN); Yutao Tang, Kunming (CN); Runzhi Mu, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 142 days.

(21) Appl. No.: 19/026,459

(22) Filed: Jan. 17, 2025

(65) Prior Publication Data

US 2026/0088624 A1 Mar. 26, 2026

(30) Foreign Application Priority Data

Sep. 24, 2024 (CN) ......................... 202411331184.X

(51) Int. Cl.
*H02J 3/36* (2026.01)
*H02J 3/40* (2026.01)
(Continued)

(52) U.S. Cl.
CPC .................. *H02J 3/36* (2013.01); *H02J 3/40* (2013.01); *H02J 2101/20* (2026.01); *H02J 2103/30* (2026.01); *H02J 2103/35* (2026.01)

(58) Field of Classification Search
CPC ............ H02J 3/36; H02J 3/40; H02J 2101/20; H02J 2103/30; H02J 2103/35; H02J 3/48; H02J 2003/365; H02J 3/00142; Y02E 60/60
See application file for complete search history.

(56) References Cited

U.S. PATENT DOCUMENTS

2020/0191117 A1* 6/2020 Li ........................... F03D 7/046
2026/0081428 A1* 3/2026 Shu ........................... H02J 3/36

FOREIGN PATENT DOCUMENTS

CN 118017544 A 5/2024

OTHER PUBLICATIONS

Wang Yuhong, et al., Multi-objective bi-level optimization design method of DC frequency limiting controller parameters, Electric Power Automation Equipment, 2022, pp. 189-196, 224, vol. 42 No. 9.

(Continued)

*Primary Examiner* — Daniel Cavallari
(74) *Attorney, Agent, or Firm* — Bayramoglu Law Offices LLC

(57) ABSTRACT

A coordinated optimization method for VSC-HVDC Frequency Synchronization Control and primary frequency regulation of hydropower includes: obtaining optimal PI parameters of the VSC-HVDC Frequency Synchronization controller from a first layer output of a dual-layer optimization model for coordinated parameters of VSC-HVDC Frequency Synchronization and primary frequency regulation; and obtaining a target PID control parameters from a second layer output of the dual-layer optimization model. The coordinated optimization method further includes adjusting the optimal PI parameters of the synchronization controller based on the target selection range and updating the PID control parameters of the primary frequency regulation system of hydropower based on the target PID control parameters. This approach aims to address the challenge of (Continued)

balancing the frequency response speed between the VSC-HVDC synchronization system and the primary frequency regulation system of hydropower.

20 Claims, 6 Drawing Sheets

(51) Int. Cl.

| | |
|---|---|
| *H02J 101/20* | (2026.01) |
| *H02J 103/30* | (2026.01) |
| *H02J 103/35* | (2026.01) |

(56) References Cited

OTHER PUBLICATIONS

Gao Qin, Effects of Frequency Limit Controller on Frequency Characteristic of Yunnan power system, A Dissertation Submitted for the Degree of Master, 2018, pp. 1-59, South China University of Technology.

Wang Jifeng, et al., Coordination Strategy of Frequency Limit Control on Multi-area HVDCs Under Asynchronous Interconnection, Power System Technology, 2023, pp. 3971-3979, vol. 47 No. 10.

* cited by examiner

COORDINATED OPTIMIZATION METHOD FOR VSC-HVDC FREQUENCY SYNCHRONIZATION CONTROL AND HYDRO POWER PRIMARY FREQUENCY REGULATION

CROSS REFERENCE TO THE RELATED APPLICATIONS

This application is based upon and claims priority to Chinese Patent Application No. 202411331184.X, filed on Sep. 24, 2024, the entire contents of which are incorporated herein by reference.

TECHNOLOGY FIELD

This application relates to the field of power system control technology, specifically to a coordinated optimization method for Voltage Source Converter based High Voltage Direct Current Transmission (VSC-HVDC) Frequency Synchronization Control and hydro power primary frequency regulation.

BACKGROUND

In large-scale power grids, asynchronous interconnection via DC links can mitigate power instability caused by significant DC power transfer shifts following DC blocking, thereby addressing ultra-low-frequency oscillation issues within the grid. However, asynchronous interconnection reduces the network scale of the sending-end grid, weakens load frequency regulation capacity, and significantly decreases rotational inertia, leading to pronounced frequency fluctuations in the grid.

Currently, to suppress ultra-low-frequency oscillations, common methods primarily involve adjusting the governor parameters of large hydraulic turbines in the sending-end grid, though this can weaken the primary frequency regulation capability of hydroelectric units. In related technical solutions, VSC-HVDC Frequency Synchronization Control systems have been employed to enhance the frequency regulation capability of grids after asynchronous interconnection. VSC-HVDC Frequency Synchronization Control primarily works by adjusting the power output of the DC transmission system, enabling the connected AC grids to maintain voltage and frequency synchronization.

However, during the conception and implementation of this application, the inventors discovered that the VSC-HVDC Frequency Synchronization Control system operates on a millisecond-scale control speed, while the conventional hydro power primary frequency regulation system operates on a second-scale control speed. This mismatch in control speeds between the two frequency regulation mechanisms can lead to issues of overcompensation. When the VSC-HVDC Frequency Synchronization Control system responds too quickly, it may stabilize the grid frequency before the hydro power primary frequency regulation system even starts. At this point, the slower hydro power primary frequency regulation system continues to execute its frequency regulation task, leading to excessive adjustment and inducing new frequency fluctuations in the grid. Therefore, a coordinated optimization method for VSC-HVDC Frequency Synchronization Control and hydro power primary frequency regulation is required to balance the frequency response speeds of the two systems, thereby enhancing the frequency stability of the grid. Therefore, a coordinated optimization method for VSC-HVDC Frequency Synchronization Control and hydro power primary frequency regulation is required to balance the frequency response speeds of the two systems, thereby enhancing the frequency stability of the grid.

The above discussion serves solely to aid in understanding the technical framework of the present invention and does not imply recognition of the aforementioned content as prior art.

SUMMARY

The primary objective of this application is to provide a coordinated optimization method for VSC-HVDC Frequency Synchronization Control and hydro power primary frequency regulation, aiming to address the challenge of balancing the frequency response speeds between the VSC-HVDC system and the hydro power primary frequency regulation system.

To achieve the above objective, this application provides a coordinated optimization method for VSC-HVDC Frequency Synchronization Control and hydro power primary frequency regulation. The method includes the following steps:

- Obtaining the target selection range for the Kp and Ki parameters of the VSC-HVDC Frequency Synchronization Controller from the first layer output of a two-layer optimization model for coordinated parameters of VSC-HVDC Frequency Synchronization and primary frequency regulation. The first layer includes a large power step disturbance scenario, where the objective function minimizes two integral indices: the frequency deviations of the sending and receiving grids and the power regulation magnitude of the VSC-HVDC system; and,
- Obtaining the target PID control parameters from the second layer output of the two-layer optimization model for coordinated VSC-HVDC Frequency Synchronization and primary frequency regulation parameters. The second layer includes an objective function constrained by the shortest time required for primary frequency reserve activation in the governor parameter-controlled generation units.

Adjusting the selection range of the Kp and Ki parameters of the synchronization controller based on the target selection range, and updating the PID control parameters of the hydro power primary frequency regulation system based on the target PID control parameters.

Optionally, the expression for the objective function that minimizes the two integral indices—sending and receiving grid frequencies and VSC-HVDC Frequency Synchronization power regulation—is as follows:

$$\min F_1(x_c) = \int_0^{t_{sim}} \Delta f(t)\,dt + 10^{\alpha} \int_0^{t_{sim}} \Delta P_{TP,double}(t)\,dt$$

Where $\min F_1(x_c)$ represents the objective function aimed at minimizing the two integral indices: the frequency deviations of the sending and receiving grids and the VSC-HVDC Frequency Synchronization power regulation magnitude. $t_{sim}$ denotes the simulation duration. $x_c$ refers to the parameters of the VSC-HVDC Frequency Synchronization control loop. $\Delta P_{TP.double}$ represents the sum of power regulation values for the VSC-HVDC synchronization at both the sending and receiving ends. $\alpha$ is a scaling factor for adjusting magnitude.

Optionally, the functional expressions for Δf(t) and $\Delta P_{TP.double}$ are as follows:

$$\begin{cases} \Delta P_{TP,double} & = \Delta P_{TP,rec} - \Delta P_{TP,inv} \\ \Delta f & = \Delta f_{rec} + \Delta f_{inv} \end{cases}$$

Where $\Delta P_{TP.rec}$ represents the power regulation amount for the sending-end system, $\Delta P_{TP.inv}$ represents the power regulation amount for the receiving-end system, $\Delta f_{rec}$ denotes the frequency deviation of the sending-end grid, $\Delta f_{inv}$ denotes the frequency deviation of the receiving-end grid.

The functional expressions for $\Delta P_{TP}(t)$ and Δf(t) are as follows:

$$\begin{cases} \Delta P_{TP,rec}(t) & = k_{TP,rec}(t - t_0) \\ \Delta P_{TP,inv}(t) & = k_{TP,inv}(t - t_0) \\ \Delta f_{rec}(t) & = \frac{k_{TP,rec}}{4H_{sys,rec}}(t - t_0)^2 - \frac{P_{lost,rec}}{2H_{sys,rec}}(t - t_0)\ t \in (t_0, t_1] \\ \Delta f_{inv}(t) & = \frac{k_{TP,inv}}{4H_{sys,inv}}(t - t_0)^2 - \frac{P_{lost,inv}}{2H_{sys,inv}}(t - t_0) \end{cases}$$

$$\begin{cases} \Delta P_{TP,rec}(t) & = k_{TP,rec}(t_P - t_1) = \frac{k_{TP,rec}P_{lost,rec}}{k_{TP,rec} + k_{hy,rec}} \\ \Delta P_{TP,inv}(t) & = k_{TP,inv}(t_P - t_1) = \frac{k_{TP,inv}P_{lost,inv}}{k_{TP,inv} + k_{hy,inv}} \\ \Delta f_{rec}(t) & = f_N + \frac{k_{TP,rec} + k_{hy,rec}}{4H_{sys,rec}}(t - t_1)^2 - \frac{P_{lost,rec}}{2H_{sys,rec}}(t - t_1) \\ \Delta f_{inv}(t) & = f_N + \frac{k_{TP,inv} + k_{hy,inv}}{4H_{sys,inv}}(t - t_1)^2 - \frac{P_{lost,inv}}{2H_{sys,inv}}(t - t_1) \end{cases}$$

Where $P_{lost}$ represents the imbalance power, $\Delta P_{TP}$ denotes the VSC-HVDC power regulation amount, $K_{hy}$ is the rate of change of the hydro turbine governor, $H_{sys}$ represents the equivalent system inertia, $k_{TP}$ is the approximate slope of the DC power variation, $f_N$ is the nominal frequency, the subscript rec indicates the sending end, and the subscript in indicates the receiving end.

Optionally, the first layer also includes the following constraints:

$$\begin{cases} \text{s.t. } g_1(x_c),\ g_2(x_c) \\ h(x_{gen}) \end{cases}$$

Where $g_1(x_c)$ represents the objective function for the initial values of the $K_p$ and $K_i$ parameters, $g_2(x_c)$ is the objective function for the VSC-HVDC power regulation constrained by the rated capacity and transmitted power of the HVDC system, $h(x_{gen})$ is the objective function representing the constraint conditions for the hydro power primary frequency regulation units.

Where $g_1(x_c)$ satisfies the following inequality constraints:

$$\begin{cases} K_{p,min} < K_{p,0} < K_{p,max} \\ K_{i,min} < K_{i,0} < K_{i,max} \end{cases}$$

Where $K_{p.0}$ and $K_{i.0}$ are the initial values of the PI controller parameters, $K_{p.max}$ and $K_{i.max}$ are the maximum values of the PI controller parameters, and $K_{p.min}$ and $K_{i.min}$ are the minimum values of the PI controller parameters.

Where $g_2(x_c)$ satisfies the following inequality constraints:

$$\begin{cases} 0 < \Delta P_{TP} < \Delta P_{TP,max} \\ \Delta P_{TP,min} < \Delta P_{TP} \le 0 \end{cases}$$

Where $\Delta P_{TP.max}$ and $\Delta P_{TP.min}$ are the upper and lower limits of the VSC-HVDC Frequency Synchronization power regulation amount, respectively.

Where $h(x_{gen})$ satisfies the following inequality constraints:

$$\begin{cases} T^{r}_{hy,i} < T^{r,max}_{hy,i} \\ P^{min}_{hy,i} < P_{hy,i} < P^{max}_{hy,i} \end{cases}$$

where $$T^{r}_{hy,i}$$

is the power ramp-up time for the hydroelectric unit participating in primary frequency regulation, $$T^{r,max}_{hy,i}$$

is the maximum ramp-up time specified by the guidelines, $$T^{r,max}_{hy,i}$$

is the output of the hydroelectric unit during primary frequency regulation, and $P_{hy.1}$ and $$P^{min}_{hy,i}$$

are the upper and lower limits of the hydroelectric unit's output during primary frequency regulation, respectively.

Optionally, the second layer also includes the following constraints:

$$\begin{cases} \min\{t_p\} \\ L(x_g) \end{cases}$$

Where min $\{t_p\}$ represents the objective function constrained by the shortest time for activating primary frequency reserves in the governor parameter-controlled units, and $L(X_g)$ represents the constraint conditions for the governor parameters.

Where $L(X_g)$ satisfies the following inequality constraints:

$$L(x_g)\begin{cases} K_{Pmin} \le K_P \le K_{Pmax} \\ K_{Dmin} \le K_D \le K_{Dmax} \\ K_{Imin} \le K_I \le K_{Imax} \end{cases}$$

Where $K_{Pmax}$, $K_{Dmax}$, and $K_{Imax}$ are the upper limits of the proportional gain, derivative gain, and integral gain of the PID controller in the hydro turbine governor system, respectively. $K_{Pmin}$, $K_{Dmin}$, and $K_{Imin}$ are the lower limits of the proportional gain, derivative gain, and integral gain of the PID controller in the hydro turbine governor system, respectively.

Optionally, the first layer is optimized based on the time-domain simulation analysis results, and particle swarm optimization (PSO) is employed to optimize the $K_p$ and $K_i$ parameters.

Optionally, the second layer is optimized using an eigenvalue sensitivity-based optimization method to ensure the fastest single-machine step response time with a positive damping ratio.

Optionally, the optimization includes the following steps:

Step S1: Initialize the $K_P$, $K_I$, and $K_D$ parameters in the hydroelectric unit regulation system.

Step S2: Based on the predefined state-space equations of the turbine and its governor closed-loop system under asynchronous interconnection, solve for the maximum real part of the eigenvalues corresponding to the $K_P$, $K_I$, and $K_D$ parameters, as well as the respective damping ratios.

Step S3: Based on the maximum real part of the eigenvalues and the predefined step size, calculate the target $K_P$, $K_I$, and $K_D$ parameters.

Step S4: Based on the target $K_P$, $K_I$, and $K_D$ parameters, evaluate whether the dynamic performance of the hydroelectric unit's primary frequency regulation has improved, specifically:

$$F(K_{P1}^*, K_{D1}^*, K_{I1}^*) \leq F(K_{P1}, K_{D1}, K_{I1})$$

Where, $$F(K_P, K_D, K_I) = \int_0^{t_f} (x_t - x_\infty)^2 dt$$

$$x_\infty = \lim_{t \to 0} \left( sG_{sys} \frac{1}{s} \right) = \frac{1}{b_p}$$

Where $x_\infty$ is the steady-state value, $t_f$ is the upper limit of the integration time, $x_t$ is the system output at time t, $G_{sys}(s)$ is the open-loop transfer function of the turbine system, s is the complex variable, and $b_p$ is the steady-state gain coefficient.

Step S5: If yes, repeat Steps S2 to S4 until the damping ratio is less than the predefined damping ratio threshold or the number of iterations reaches the predefined iteration threshold.

Step S6: Output the current target $K_P$, $K_I$, and $K_D$ parameters as the target PID control parameters.

Additionally, to achieve the above objectives, this application also provides a grid frequency regulation system. The grid frequency regulation system includes a memory, a processor, and a coordinated optimization program for VSC-HVDC Frequency Synchronization Control and hydro power primary frequency regulation stored in the memory and executable on the processor. When executed by the processor, the coordinated optimization program performs the steps of the coordinated optimization method for VSC-HVDC Frequency Synchronization Control and hydro power primary frequency regulation as described above.

Additionally, to achieve the above objectives, this application also provides a computer-readable storage medium storing a coordinated optimization program for VSC-HVDC Frequency Synchronization Control and hydro power primary frequency regulation. When executed by a processor, the coordinated optimization program performs the steps of any of the coordinated optimization methods for VSC-HVDC Frequency Synchronization Control and hydro power primary frequency regulation as described above.

This application achieves at least the following technical effects:

1. By establishing a two-layer optimization model for the coordinated parameters of VSC-HVDC Frequency Synchronization Control and hydro power primary frequency regulation, the method effectively balances the response speed differences between the two frequency regulation systems. This enables efficient coordination of VSC-HVDC Frequency Synchronization Control and hydro power primary frequency regulation across different time scales, avoiding issues of over-adjustment or uncoordinated regulation, thereby enhancing grid frequency stability.
2. By optimizing the value range of the $K_p$ (proportional gain) and $K_i$ (integral gain) parameters of the Proportional-Integral (PI) controller, the method prevents frequency regulation overshoot caused by an excessively large $K_p$, which could overly enhance the VSC-HVDC system's response to frequency changes. Additionally, it avoids excessive system adjustment speed due to an overly large $K_i$, which could interfere with the hydro power primary frequency regulation system's response.

Since the hydro power primary frequency regulation system has a relatively slower response speed (on the order of seconds), the objective of the second-layer optimization is to enhance the response efficiency of the hydro power frequency regulation system. This allows it to effectively take over frequency regulation tasks after the VSC-HVDC system has initially stabilized the frequency, ensuring stability during frequency recovery. By optimizing the PID controller parameters of the hydroelectric units, the response speed of the hydro power primary frequency regulation system is improved during reserve frequency regulation.

By optimizing the P (proportional) value, the hydro power system can smoothly engage in the frequency regulation process following the VSC-HVDC system's initial frequency adjustment. The I (integral) value is typically used to eliminate steady-state frequency error; optimizing the I value ensures that the hydro power system can accurately restore grid frequency during later adjustment stages. The D (derivative) value helps to suppress fluctuations in the rate of frequency change; optimizing the D value enables the hydro power system to regulate frequency more smoothly.

DETAILED DESCRIPTION OF THE EMBODIMENTS

To better understand the technical solutions described above, exemplary embodiments of this disclosure will be described in more detail below with reference to the accompanying figures. Although the figures illustrate exemplary embodiments of this disclosure, it should be understood that the disclosure may be implemented in various forms and should not be limited to the embodiments presented here. Rather, these embodiments are provided to offer a more thorough understanding of the disclosure and to fully convey the scope of the disclosure to those skilled in the art.

Figure 1:
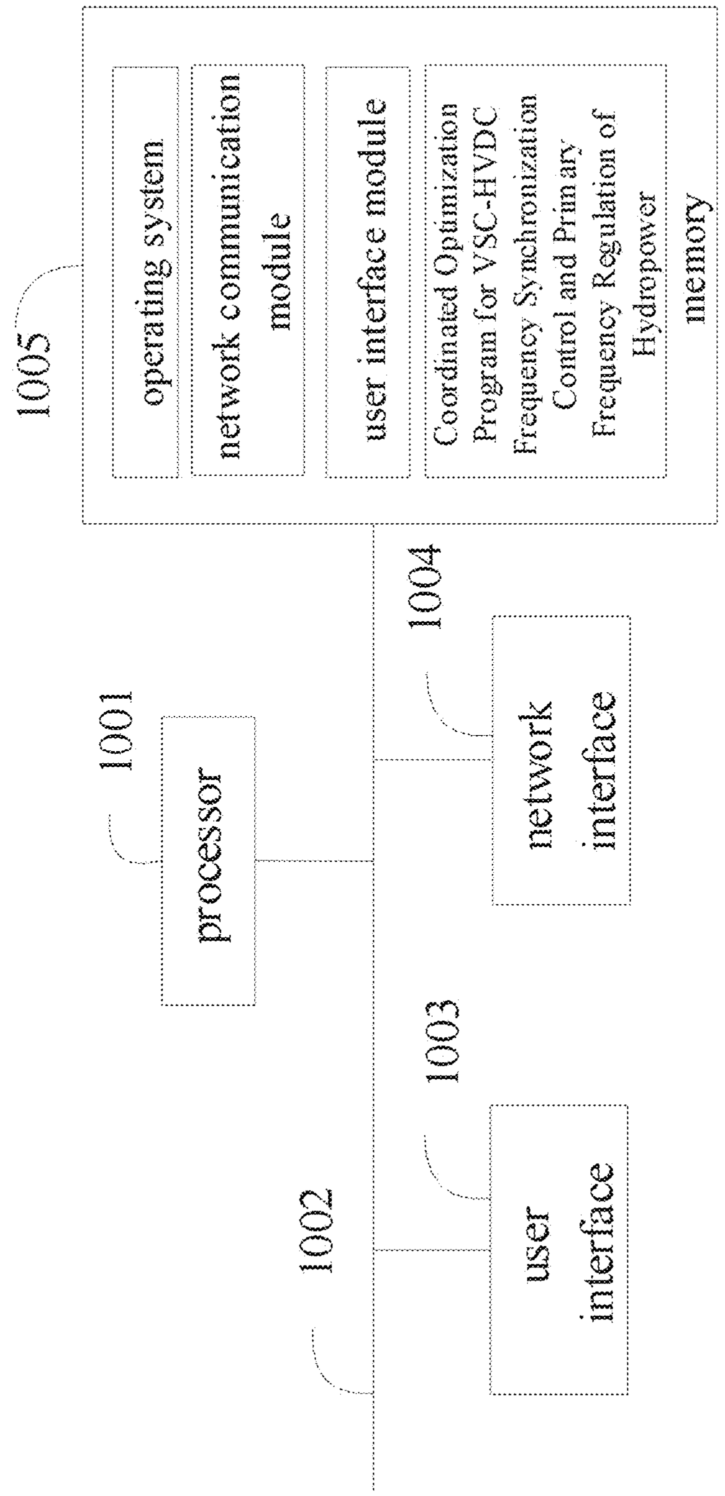
FIG. 1 is a schematic diagram illustrating the hardware architecture of the operating environment for the grid frequency regulation system involved in the embodiments of this application.

As an implementation solution. FIG. 1 is a schematic diagram of the hardware architecture of the operating environment for the grid frequency regulation system involved in the embodiment of this application.

As shown in FIG. 1, the grid frequency regulation system may include: a processor 1001, such as a CPU, memory 1005, a user interface 1003, a network interface 1004, and a communication bus 1002. The communication bus 1002 enables interconnection and communication among these components. The user interface 1003 may include a display screen and input devices such as a keyboard. Optionally, the user interface 1003 may also include standard wired or wireless interfaces. The network interface 1004 can optionally include standard wired or wireless interfaces (e.g., a Wi-Fi interface). The memory 1005 can be high-speed RAM or non-volatile storage (e.g., disk storage). Optionally, memory 1005 may also be a storage device separate from the processor 1001.

A person skilled in the art will understand that the grid frequency regulation system architecture shown in FIG. 1 does not limit the system. It may include more or fewer components than illustrated, combine certain components, or arrange components differently.

As shown in FIG. 1, the memory 1005, serving as a storage medium, may include the operating system, network communication module, user interface module, and the coordinated optimization program for VSC-HVDC Frequency Synchronization Control and hydro power primary frequency regulation. The operating system manages and controls the hardware and software resources of the grid frequency regulation system, facilitating the execution of the coordinated optimization program and other software or programs.

In the grid frequency regulation system shown in FIG. 1, the user interface 1003 primarily connects to the terminal for data communication with it; the network interface 1004 primarily connects to the backend server for data communication. The processor 1001 can be used to invoke the coordinated optimization program for VSC-HVDC Frequency Synchronization Control and hydro power primary frequency regulation stored in memory 1005.

In this embodiment, the grid frequency regulation system includes: memory 1005, processor 1001, and a coordinated optimization program for VSC-HVDC Frequency Synchronization Control and hydro power primary frequency regulation stored in the memory and executable on the processor, where:

When the processor 1001 invokes the coordinated optimization program for VSC-HVDC Frequency Synchronization Control and hydro power primary frequency regulation stored in memory 1005, it performs the following operations:

Obtaining the target selection range for the $K_p$ and $K_i$ parameters of the VSC-HVDC Frequency Synchronization Controller from the first layer output of a two-layer optimization model for coordinated parameters of VSC-HVDC Frequency Synchronization and primary frequency regulation. The first layer includes a large power step disturbance scenario, where the objective function minimizes two integral indices: the frequency deviations of the sending and receiving grids and the power regulation magnitude of the VSC-HVDC system, and, Obtaining the target PID control parameters from the second layer output of the two-layer optimization model for coordinated VSC-HVDC Frequency Synchronization and primary frequency regulation parameters. The second layer includes an objective function constrained by the shortest time required for primary frequency reserve activation in the governor parameter-controlled generation units.

Adjusting the selection range of the $K_p$ and $K_i$ parameters of the synchronization controller based on the target selection range, and updating the PID control parameters of the hydro power primary frequency regulation system based on the target PID control parameters.

When the processor 1001 calls the coordinated optimization program for VSC-HVDC Frequency Synchronization Control and hydro power primary frequency regulation stored in memory 1005, it performs the following operations:

Step S1: Initialize the $K_P$, $K_I$, and $K_D$ parameters in the hydroelectric unit regulation system.

Step S2: Based on the predefined state-space equations of the turbine and its governor closed-loop system under asynchronous interconnection, solve for the maximum real part of the eigenvalues corresponding to the $K_P$, $K_I$, and $K_D$ parameters, as well as the respective damping ratios.

Step S3: Based on the maximum real part of the eigenvalues and the predefined step size, calculate the target $K_P$, $K_I$, and $K_D$ parameters.

Step S4: Based on the target $K_P$, $K_I$, and $K_D$ parameters, evaluate whether the dynamic performance of the hydroelectric unit's primary frequency regulation has improved, specifically:

$$F(K_{P1}^*, K_{D1}^*, K_{I1}^*) \le F(K_{P1}, K_{D1}, K_{I1})$$

Where, $$F(K_P, K_D, K_I) = \int_0^{t_f} (x_t - x_\infty)^2 dt$$

$$x_\infty = \lim_{t \to 0}\left(sG_{sys}\frac{1}{s}\right) = \frac{1}{b_p}$$

Where $x_\infty$ is the steady-state value, $t_f$ is the upper limit of the integration time, $x_t$ is the system output at time t, $G_{sys}(s)$ is the open-loop transfer function of the turbine system, s is the complex variable, and $b_p$ is the steady-state gain coefficient.

Step S5: If yes, repeat Steps S2 to S4 until the damping ratio is less than the predefined damping ratio threshold or the number of iterations reaches the predefined iteration threshold.

Step S6: Output the current target $K_P$, $K_I$, and $K_D$ parameters as the target PID control parameters.

Based on the hardware architecture of the grid frequency regulation system in the above power system control technology, this application proposes an embodiment of the coordinated optimization method for VSC-HVDC Frequency Synchronization Control and hydro power primary frequency regulation.

First Embodiment

Figure 2:
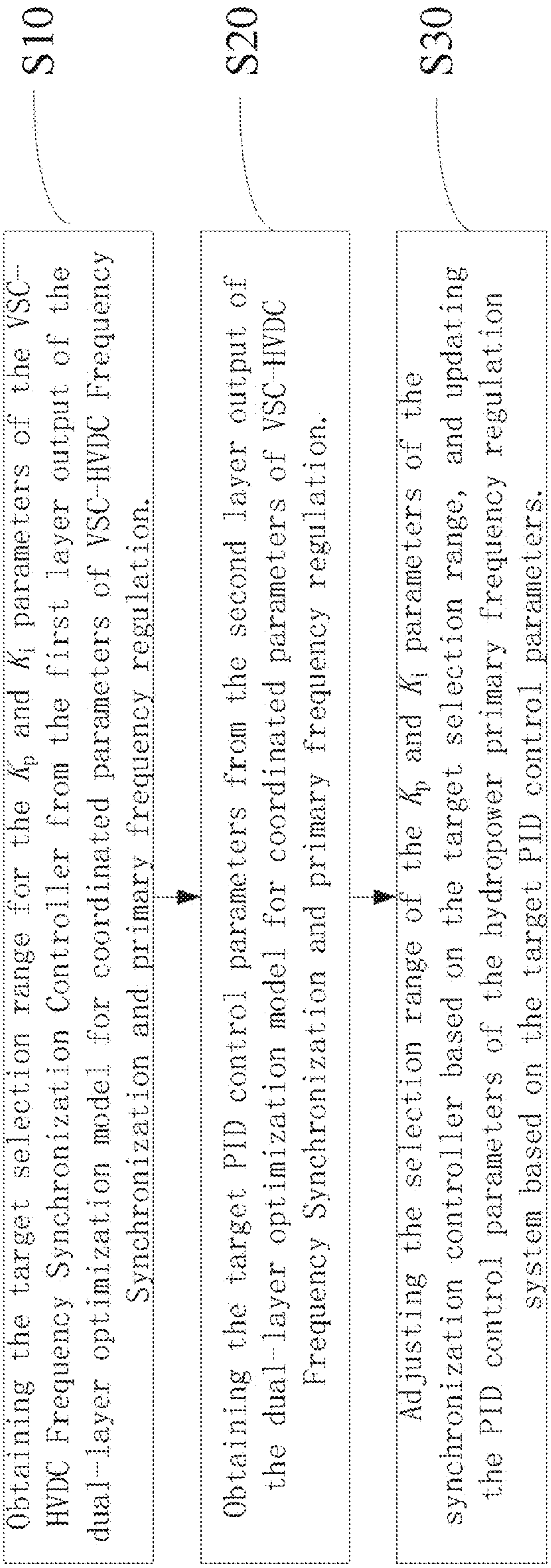
FIG. 2 is a flowchart illustrating the first embodiment of the coordinated optimization method for VSC-HVDC Frequency Synchronization Control and hydro power primary frequency regulation in this application.

Referring to FIG. 2, in the first embodiment, the coordinated optimization method for VSC-HVDC Frequency Synchronization Control and hydro power primary frequency regulation includes the following steps:

Step S11: Obtain the target selection range for the $K_p$ and $K_i$ parameters of the VSC-HVDC Frequency Synchronization Controller from the first layer output of a two-layer optimization model for coordinated parameters of VSC-HVDC Frequency Synchronization and primary frequency regulation. The first layer includes an objective function that minimizes two integral indices: the frequency deviations of the sending and receiving grids and the VSC-HVDC Frequency Synchronization power regulation magnitude under large power step disturbances; and, Step S12: Obtain the target PID control parameters from the second layer output of the two-layer optimization model for coordinated parameters of VSC-HVDC Frequency Synchronization and primary frequency regulation. The second layer includes an objective function constrained by the shortest time required for primary frequency reserve activation in the governor-controlled units.

Step S20: Adjust the selection range of the $K_p$ and $K_i$ parameters of the synchronization controller based on the target selection range, and update the PID control parameters of the hydro power primary frequency regulation system based on the target PID control parameters.

In this embodiment, a two-layer optimization model for coordinated parameters of VSC-HVDC Frequency Synchronization and primary frequency regulation is constructed. This model includes a first layer and a second layer. The first layer is used to adjust the selection range of the $K_p$ and $K_i$ parameters of the VSC-HVDC Frequency Synchronization Controller, while the second layer is used to adjust the PID control parameters of the hydro power primary frequency regulation system.

In the first layer of the model, an objective function is set to minimize two integral indices: the sending and receiving grid frequencies and the VSC-HVDC Frequency Synchronization power regulation magnitude. The expression for this objective function is as follows:

$$\min F_1(x_c) = \int_0^{t_{sim}} \Delta f(t)dt + 10^{\alpha} \int_0^{t_{sim}} \Delta P_{TP.double}(t)dt$$

Where $\min F_1(x_c)$ represents the objective function aimed at minimizing the two integral indices: the frequency deviations of the sending and receiving grids and the VSC-HVDC Frequency Synchronization power regulation magnitude. $t_{sim}$ denotes the simulation duration. $x_c$ refers to the parameters of the VSC-HVDC Frequency Synchronization control loop. $\Delta P_{TP.double}$ represents the sum of power regulation values for the VSC-HVDC synchronization at both the sending and receiving ends. $\alpha$ is a scaling factor for adjusting magnitude.

Further, in this embodiment, the functional expressions for $\Delta f(t)$ and $\Delta P_{TP.double}$ are as follows:

$$\begin{cases} \Delta P_{TP.double} = \Delta P_{TP.rec} - \Delta P_{TP.inv} \\ \Delta f = \Delta f_{rec} + \Delta f_{inv} \end{cases}$$

Where $\Delta P_{TP.rec}$ represents the power regulation amount for the sending-end system, $\Delta P_{TP.inv}$ represents the power regulation amount for the receiving-end system, $\Delta f_{rec}$ denotes the frequency deviation of the sending-end grid, $\Delta f_{inv}$ denotes the frequency deviation of the receiving-end grid.

The functional expressions for $\Delta P_{TP}(t)$ and $\Delta f(t)$ are as follows:

$$\begin{cases} \Delta P_{TP.rec}(t) = k_{TP.rec}(t - t_0) \\ \Delta P_{TP.inv}(t) = k_{TP.inv}(t - t_0) \\ \Delta f_{rec}(t) = \dfrac{k_{TP.rec}}{4H_{sys.rec}}(t - t_0)^2 - \dfrac{P_{lost.rec}}{2H_{sys.rec}}(t - t_0) \; t \in (t_0, t_1] \\ \Delta f_{inv}(t) = \dfrac{k_{TP.inv}}{4H_{sys.inv}}(t - t_0)^2 - \dfrac{P_{lost.inv}}{2H_{sys.inv}}(t - t_0) \end{cases}$$

$$\begin{cases} \Delta P_{TP.rec}(t) = k_{TP.rec}(t_P - t_1) = \dfrac{k_{TP.rec}P_{lost.rec}}{k_{TP.rec} + k_{hy.rec}} \\ \Delta P_{TP.inv}(t) = k_{TP.inv}(t_P - t_1) = \dfrac{k_{TP.inv}P_{lost.inv}}{k_{TP.inv} + k_{hy.inv}} \\ \Delta f_{rec}(t) = f_N + \dfrac{k_{TP.rec} + k_{hy.rec}}{4H_{sys.rec}}(t - t_1)^2 - \dfrac{P_{lost.rec}}{2H_{sys.rec}}(t - t_1) \\ \Delta f_{inv}(t) = f_N + \dfrac{k_{TP.inv} + k_{hy.inv}}{4H_{sys.inv}}(t - t_1)^2 - \dfrac{P_{lost.inv}}{2H_{sys.inv}}(t - t_1) \end{cases} \; t \in (t_1, t_P]$$

Where $P_{lost}$ represents the imbalance power, $\Delta P_{TP}$ denotes the VSC-HVDC power regulation amount, $K_{hy}$ is the rate of change of the hydro turbine governor, $H_{sys}$ represents the equivalent system inertia, $k_{TP}$ is the approximate slope of the DC power variation, $f_N$ is the nominal frequency, the subscript rec indicates the sending end, and the subscript in indicates the receiving end.

Optionally, the first layer also includes the following constraints:

$$\begin{cases} \text{s.t.} g_1(x_c), g_2(x_c) \\ h(x_{gen}) \end{cases}$$

Where $g_1(x_c)$ represents the objective function for the initial values of the $K_p$ and $K_i$ parameters, $g_2(x_c)$ is the objective function for the VSC-HVDC power regulation constrained by the rated capacity and transmitted power of the HVDC system, $h(x_{gen})$ is the objective function representing the constraint conditions for the hydro power primary frequency regulation units.

Where $g_1(x_c)$ satisfies the following inequality constraints:

$$\begin{cases} K_{p.min} < K_{p.0} < K_{p.max} \\ K_{i.min} < K_{i.0} < K_{i.max} \end{cases}$$

Where $K_{p.0}$ and $K_{i.0}$ are the initial values of the PI controller parameters, $K_{p.max}$ and $K_{i.max}$ are the maximum values of the PI controller parameters, and $K_{p.min}$ and $K_{i.min}$ are the minimum values of the PI controller parameters.

Where $g_2(x_c)$ satisfies the following inequality constraints:

$$\begin{cases} 0 < \Delta P_{TP} < \Delta P_{TP.max} \\ \Delta P_{TP.min} < \Delta P_{TP} \le 0 \end{cases}$$

Where $\Delta P_{TP.max}$ and $\Delta P_{TP.min}$ are the upper and lower limits of the VSC-HVDC Frequency Synchronization power regulation amount, respectively.

As VSC-HVDC Frequency Synchronization serves as an auxiliary means for primary frequency regulation in the grid, it must work in coordination with conventional units to regulate grid frequency, preventing any interference from VSC-HVDC actions that could disrupt the normal primary frequency response of conventional units. Therefore, when optimizing the control parameters for VSC-HVDC Frequency Synchronization, the primary frequency response of conventional units must meet the requirements of grid guidelines. Specifically, $h(x_{gen})$ must satisfy the following inequality constraints:

$$\begin{cases} T^{r}_{hy.i} < T^{r.max}_{hy.i} \\ P^{min}_{hy.i} < P_{hy.i} < P^{max}_{hy.i} \end{cases}$$

where $$T^{r}_{hy.i}$$

is the power ramp-up time for the hydroelectric unit participating in primary frequency regulation, $$T^{r.max}_{hy.i}$$

is the maximum ramp-up time specified by the guidelines, $$T^{r.max}_{hy.i}$$

is the output of the hydroelectric unit during primary frequency regulation, and $P_{hy.i}$ and $$P^{min}_{hy.i}$$

are the upper and lower limits of the hydroelectric unit's output during primary frequency regulation, respectively.

In this embodiment, in addition to objectives and damping constraints, the model also incorporates feasible range limits for the PID parameters based on practical requirements. This ensures that the VSC-HVDC unit operates within a safe range, avoiding overload. Therefore, in the second layer of the model, an objective function $\min\{t_p\}$ is set, constrained by the shortest activation time for primary frequency reserves in the governor-controlled units.

Additionally, the second layer also includes constraints on the governor parameters, where $L(X_g)$ satisfies the following inequality constraints:

$$L(x_g) = \begin{cases} K_{Pmin} \le K_P \le K_{Pmax} \\ K_{Dmin} \le K_D \le K_{Dmax} \\ K_{Imin} \le K_I \le K_{Imax} \end{cases}$$

Where $K_{Pmax}$, $K_{Dmax}$, and $K_{Imax}$ are the upper limits of the proportional gain, derivative gain, and integral gain of the PID controller in the hydro turbine governor system, respectively. $K_{Pmin}$, $K_{Dmin}$, and $K_{Imin}$ are the lower limits of the proportional gain, derivative gain, and integral gain of the PID controller in the hydro turbine governor system, respectively.

Figure 3:
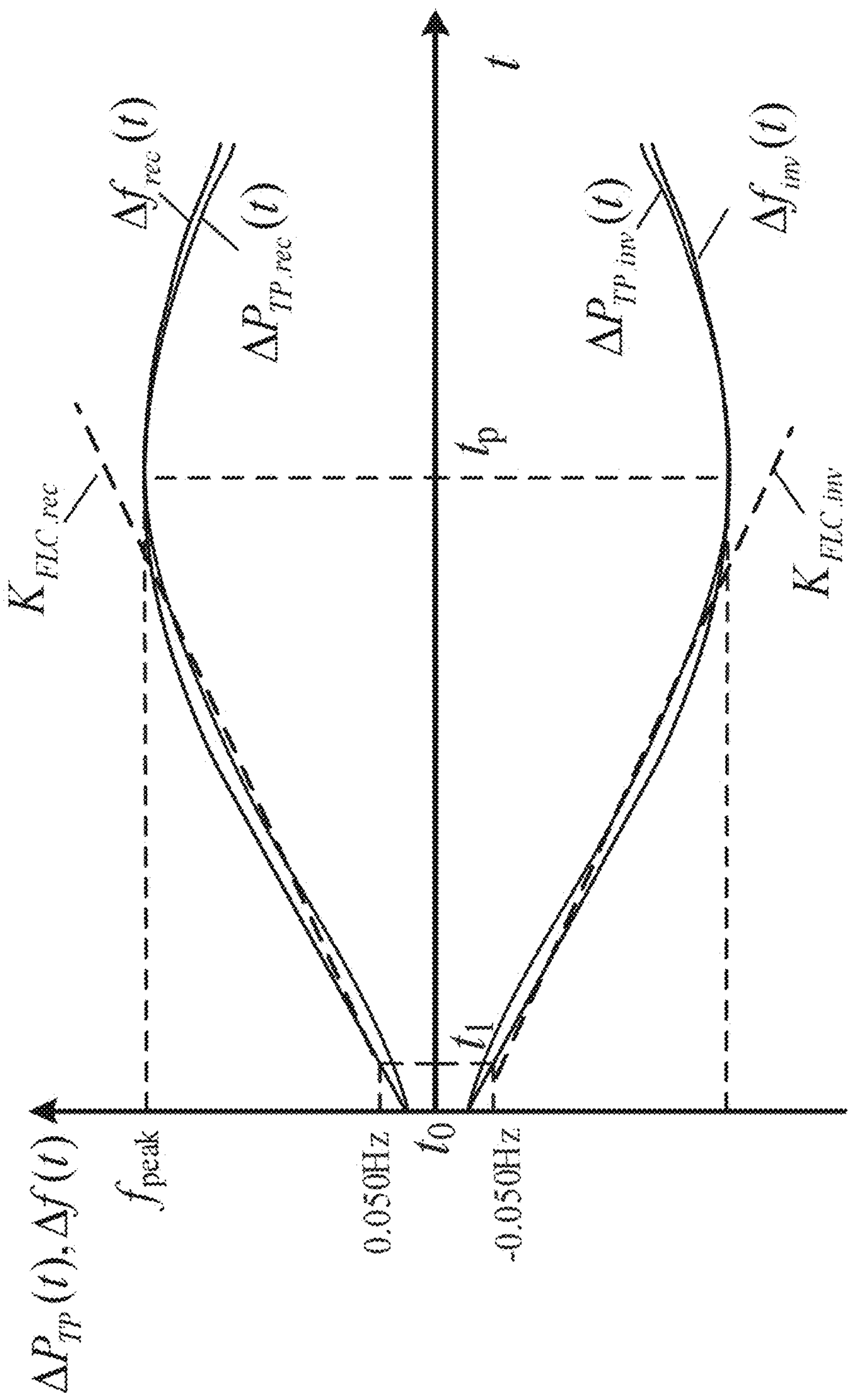
FIG. 3 is a schematic diagram illustrating the changes in frequency and VSC-HVDC power regulation of the sending-end grid under a power surplus disturbance, as related to the embodiments of this application.

Exemplarily, referring to FIG. 3, which illustrates the changes in frequency and VSC-HVDC power regulation of the sending-end grid under a power surplus disturbance, the following are shown: 0.050 Hz represents the upper limit of the dead band for the turbine governor. $t_0$-$t_1$ indicates the time interval during which the system frequency reaches each dead band upper limit. $f_{peak}$ is the frequency peak value. $t_p$ is the time at which the frequency reaches its peak. $\Delta P_{TP}$ is the VSC-HVDC power regulation amount. $K_{hy}$ is the approximate slope of DC power variation, which is related to the parameters of the VSC-HVDC control module.

In the technical solution provided in this embodiment, a two-layer optimization model for coordinated parameters of VSC-HVDC Frequency Synchronization Control and primary frequency regulation is constructed. This model includes a first layer and a second layer: First Layer: This layer adjusts the selection range for the $K_p$ (proportional gain) and $K_i$ (integral gain) parameters of the VSC-HVDC Frequency Synchronization controller. By optimizing these values within the Proportional-Integral (PI) controller, it prevents frequency regulation overshoot that may arise if $K_p$ is too large, resulting in an excessively sensitive response to frequency changes in the VSC-HVDC system. It also avoids overly rapid adjustment from a large $K_i$, which could interfere with the response of the hydro power primary frequency regulation system. Second Layer: This layer adjusts the PID control parameters of the hydro power primary frequency regulation system. By optimizing: The P (proportional) value, it ensures that after the VSC-HVDC system initially stabilizes the frequency, the hydro system can smoothly engage in the frequency regulation process. The I (integral) value, typically used to eliminate steady-state frequency error, optimizing I ensures that the hydro system can accurately restore grid frequency during the later stages of adjustment. The D (derivative) value, used to suppress fluctuations in the rate of frequency change, optimizing D helps the hydro system to regulate frequency more smoothly.

Second Embodiment

In this embodiment, based on the time-domain simulation analysis results, the first layer is optimized, and particle swarm optimization is employed to tune the $K_p$ and $K_i$ parameters.

Specifically, the first layer optimization is based on time-domain simulation analysis results. The Particle Swarm Optimization (PSO) algorithm is used to optimize the $K_p$ and $K_i$ parameters of the same-frequency controller. The optimization process for the objective function model and the determination of the selection range for $K_p$ and $K_i$ parameters includes the following steps:

S1. Set the model's initial parameters, including the size of the particle swarm, as well as the initial positions and initial velocities in the solution space.

S2. Calculate the fitness function for each particle to find the current optimal solution for each individual particle and determine the current global optimal solution for the entire particle swarm.

S3. Update the velocity, position, and weight parameters of each particle.

S4. Update the controller parameters $K_p$ and $K_i$ based on the latest particle parameters.

S5. Check if the updated controller parameters $K_p$ and $K_i$ meet the required iterative accuracy. If they do, proceed to step S7, if not, proceed to step S6.

S6. Return the updated controller parameters $K_p$ and $K_i$ to step S2.

S7. Output the optimized controller parameter values and the evaluation results.

Third Embodiment

Based on the first embodiment, in this embodiment, the second layer is optimized using an eigenvalue sensitivity-based optimization method to ensure that the single-machine step response time is minimized and the damping ratio remains positive. This optimization includes the following steps:

Step S1: Initialize the $K_P$, $K_I$, and $K_D$ parameters in the hydroelectric unit regulation system.

Step S2: Based on the predefined state-space equations of the turbine and its governor closed-loop system under asynchronous interconnection, solve for the maximum real part of the eigenvalues corresponding to the $K_P$, $K_I$, and $K_D$ parameters, as well as the respective damping ratios.

Step S3: Based on the maximum real part of the eigenvalues and the predefined step size, calculate the target $K_P$, $K_I$, and $K_D$ parameters.

Step S4: Based on the target $K_P$, $K_I$, and $K_D$ parameters, evaluate whether the dynamic performance of the hydroelectric unit's primary frequency regulation has improved, specifically:

$$F(K_{P1}^*, K_{D1}^*, K_{I1}^*) \leq F(K_{P1}, K_{D1}, K_{I1})$$

Where, $$F(K_P, K_D, K_I) = \int_0^{t_f} (x_t - x_\infty)^2 dt$$

$$x_\infty = \lim_{t\to 0}\left(sG_{sys}\frac{1}{s}\right) = \frac{1}{b_p}$$

Where $x_\infty$ is the steady-state value, $t_f$ is the upper limit of the integration time, $x_t$ is the system output at time t, $G_{sys}(s)$ is the open-loop transfer function of the turbine system, s is the complex variable, and $b_p$ is the steady-state gain coefficient.

Step S5: If yes, repeat Steps S2 to S4 until the damping ratio is less than the predefined damping ratio threshold or the number of iterations reaches the predefined iteration threshold.

Step S6: Output the current target $K_P$, $K_I$, and $K_D$ parameters as the target PID control parameters.

Furthermore, in this embodiment, prior to step S1, the responsiveness of primary frequency reserve activation for the unit is required. This includes:

Step S5: Solve the step response function x(t).

Figure 4:
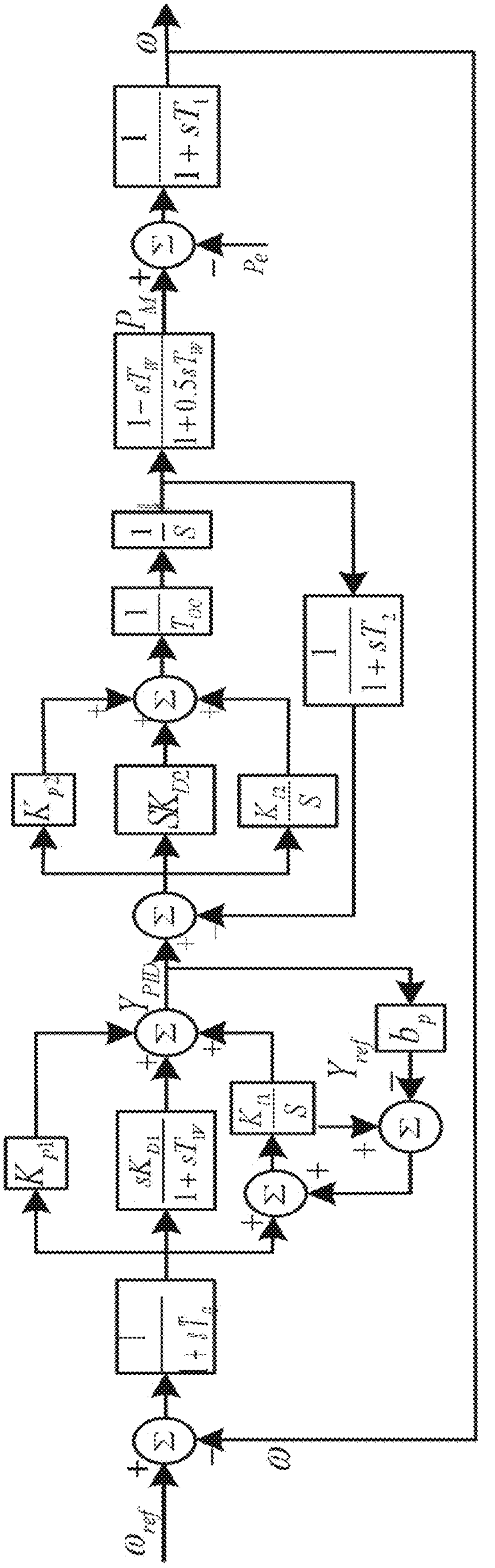
FIG. 4 is a schematic diagram showing the open-loop transfer function of the turbine system, derived from the open-loop transfer functions of the hydroelectric unit regulation system, the electro-hydraulic servo system, and the prime mover, as related to the embodiments of this application.

Referring to the open-loop transfer function of the hydroelectric unit regulation system, the electro-hydraulic servo system, and the prime mover shown in FIG. 4, the open-loop transfer function schematic of the turbine system can be obtained, which reveals the following:

$$G_{sys}(s) = G_{Gm}(s)\cdot G_{GA}(s)\cdot G_{Tw}(s)$$

In this expression, $G_{Gm}(S)$ represents the open-loop transfer function of the hydroelectric unit regulation system, $G_{GA}(S)$ represents the open-loop transfer function of the electro-hydraulic servo system, and $G_{TW}(S)$ represents the open-loop transfer function of the prime mover. Their respective expressions are as follows;

$$\begin{cases} G_{Gm}(s) = \dfrac{Y_{PID}}{\Delta\omega} = \dfrac{K_{P1} + \dfrac{K_{D1}s}{1+T_{1v}s} + \dfrac{K_{I1}}{s}}{1 + \dfrac{K_{I1}b_P}{s}}\dfrac{K_W}{1+T_{R1}s} \\ G_{GA}(s) = \dfrac{P_{GV}}{P_{CV}} = \dfrac{\left(K_{P2} + K_{D2}s + \dfrac{K_{I2}}{s}\right)}{\dfrac{1}{T_1 s+1}\left(K_{P2} + K_{D2}s + \dfrac{K_{I2}}{s}\right) + T_{oc}s} \\ G_{Tw}(s) = \dfrac{P_M}{P_{GV}} = \dfrac{1+T_w s}{1+0.5T_w s} \end{cases}$$

Where: $K_{P1}$, $K_{I1}$, and $K_{D1}$ are the proportional gain, integral gain, and derivative gain of the PID controller for the turbine governor system. $K_{P2}$, $K_{I2}$, and $K_{D2}$ are the proportional gain, integral gain, and derivative gain of the PID control parameters for the servo system. s is the Laplace operator. $T_{1v}$ is the measurement inertia time constant. $b_p$ is the droop coefficient. $K_W$ is the amplification factor for frequency deviation. $T_{R1}$ is the time constant of the frequency measurement component. T1 is the time constant for the stroke feedback of the oil motor (LVDT). $T_{oc}$ ($T_O$, $T_C$) represents the oil motor's opening/closing time constants. TW is the water starting time constant for the open-loop system.

Based on the open-loop transfer function of the turbine system, solve for the corresponding step response function x(t).

$$x(t) = L^{-1}\left[G_{sys}(s)/s\right]$$

Step S6: Establish the system state equations.

Further, establish the linearized state-space equations for the hydroelectric unit regulation system, electro-hydraulic servo system, prime mover, and synchronous machine. These equations are then combined to form the state-space equations of the turbine and its speed regulation closed-loop system under asynchronous interconnection. The state-space equations of the turbine and its speed regulation closed-loop system under asynchronous interconnection are as follows:

$$T\frac{dx}{dt} = Jx$$

Where x represents the state variables of the turbine and its speed regulation closed-loop system. The coefficient matrix and the Jacobian matrix J are expressed as:

$$T = \begin{bmatrix}
T_{R1} &&&&&&&&&&&&&&&& \\
& 0 &&&&&&&&&&&&&&& \\
K_{D1} && -T_W &&&&&&&&&&&&&& \\
&&& 0 &&&&&&&&&&&&& \\
&&&& 1 &&&&&&&&&&&& \\
&&&&& 0 &&&&&&&&&&& \\
&&&&&& 0 &&&&&&&&&& \\
&&&&&&& 0 &&&&&&&&& \\
&&&&&& K_{D2} && 0 &&&&&&&& \\
&&&&&&&&& 0 &&&&&&& \\
&&&&&&&&&& 1 &&&&&& \\
&&&&&&&&&&& 0 &&&&& \\
&&&&&&&&&&&& 0 &&&& \\
&&&&&&&&&&&&& 1 &&& \\
&&&&&&&&&&&&&& T_2 && \\
&&&&&&&&&&&&&&& 0.5T_W & \\
&&&&&&&&&&&&&&&& T_J
\end{bmatrix}$$

$$J = \begin{bmatrix}
-1 &&&&&&&&&&&&&&&& \\
& -1 &&&&&&&&&&&&&&& \\
K_{P1} && 1 &&&&&&&&&&&&&& \\
1 &&& -1 && 1 &&&&&&&&&&& \\
&&& K_{I1} & 0 &&&&&&&&&&&& \\
&&&&& 1 & b_p &&&&&&&&&& \\
& 1 & 1 && 1 && -1 &&&&&&&&&& \\
&&&&&& 1 & -1 &&&&&&&&& \\
&&&&&&& K_{p2} & -1 &&&&&&&& \\
&&&&&&&&& 1 &&&&&&& \\
&&&&&&& K_{I2} &&& 0 &&&&&& \\
&&&&&&&& 1 & 1 & 1 & -1 &&&&& \\
&&&&&&&&&&& 1 & -T_{OC} &&&& \\
&&&&&&&&&&&& 1 & 0 &&& \\
&&&&&&&&&&&&& 1 & -1 && \\
&&&&&&&&&&&&& 1 && -1 & \\
&&&&&&&&&&&&&&& 1 & -K_D
\end{bmatrix}$$

Step S7: Determine the eigenvalue with,

Solve for the eigenvalue with the largest real part in the state-space equation of the turbine and its speed regulation closed-loop system under asynchronous interconnection, and determine its corresponding damping ratio, $\xi=-\sigma/\sqrt{\sigma^2+\omega^2}$. Based on the state-space equation, use this dominant eigenvalue to calculate the sensitivity of the hydroelectric unit regulation system's proportional, integral, and derivative parameters, denoted as $$\frac{\partial\lambda}{\partial K_{P1}}, \frac{\partial\lambda}{\partial K_{I1}}, \text{ and } \frac{\partial\lambda}{\partial K_{D1}},$$

respectively.

Furthermore, after completing Step S7 and calculating the sensitivities, proceed with executing the initialization of parameters in Step S1, followed by the iterative steps for optimizing the target PID control parameters.

Fourth Embodiment

Figure 5:
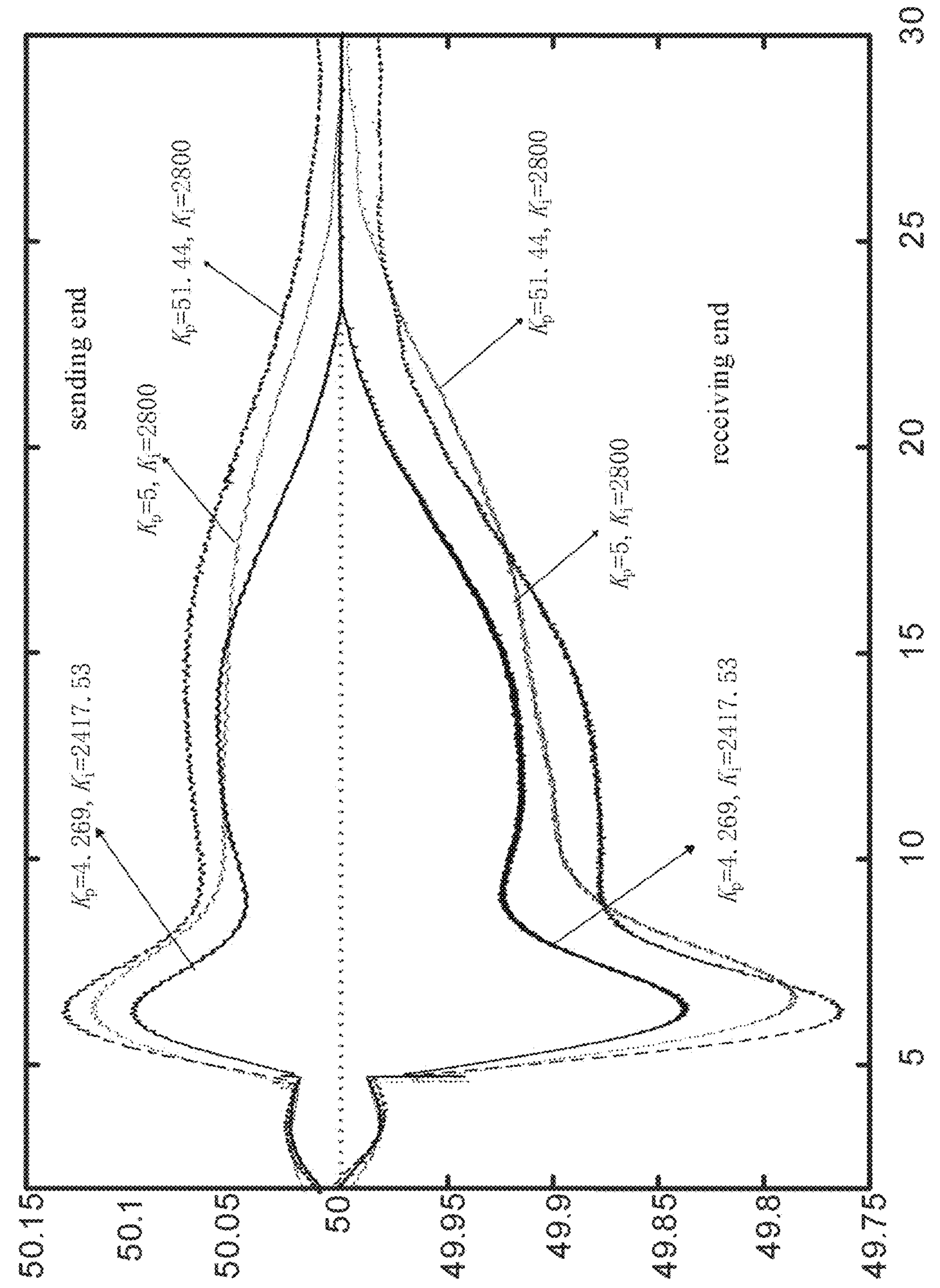
FIG. 5 is a schematic diagram illustrating the frequency recovery times at the sending and receiving ends under different $K_p$ and $K_i$ values, as related to the embodiments of this application.

To validate the feasibility of the above approach, in this embodiment, after multiple iterative searches of the particle swarm within the dual-layer optimization model for VSC-HVDC Frequency in frequency synchronization control were determined as $K_{p.optimal}$=4.269 and $K_{i.optimal}$=2417.53. The frequency recovery times at the sending and receiving ends under different $K_p$ and $K_i$ values are shown in FIG. 5.

| Parameter combination | Control parameters $K_p$ | $K_i$ | Frequency peak/Hz Sending-end grid | Receiving-end grid | Frequency recovery synchronization time |
|---|---|---|---|---|---|
| Initial Parameter 1 | 51.44 | 2800 | 50.13 | 49.76 | 49 |
| Initial Parameter 2 | 5 | 2800 | 50.12 | 49.78 | 29.11 |
| Optimization parameters | 4.269 | 2417.53 | 50.10 | 49.84 | 23.83 |

Based on the first-layer optimization, the proposed method was applied to optimize the parameters of the Yunnan-Luxi power grid, resulting in $K_{P.optimal}$=3.5, $K_{I.optimal}$=1.5, and $K_{D.optimal}$=3. Table 2 below lists 5 sets of optimized parameters and their corresponding response times for comparison:

| Parameter combination | Control parameters $K_P$ | $K_D$ | $K_I$ | Response time/s |
|---|---|---|---|---|
| Initial Parameter 1 | 2 | 0.5 | 1.6 | 166.72 |
| Initial Parameter 2 | 3 | 3 | 2.1 | 148.62 |
| Initial Parameter 3 | 2 | 1.5 | 2.1 | 146.81 |
| Initial Parameter 4 | 3.5 | 1.5 | 2.1 | 122.25 |
| Optimization parameters | 3.5 | 1.5 | 3 | 96.22 |

It can be observed that the response time with the optimized parameters is significantly shorter than that with the traditional parameters.

Figure 6:
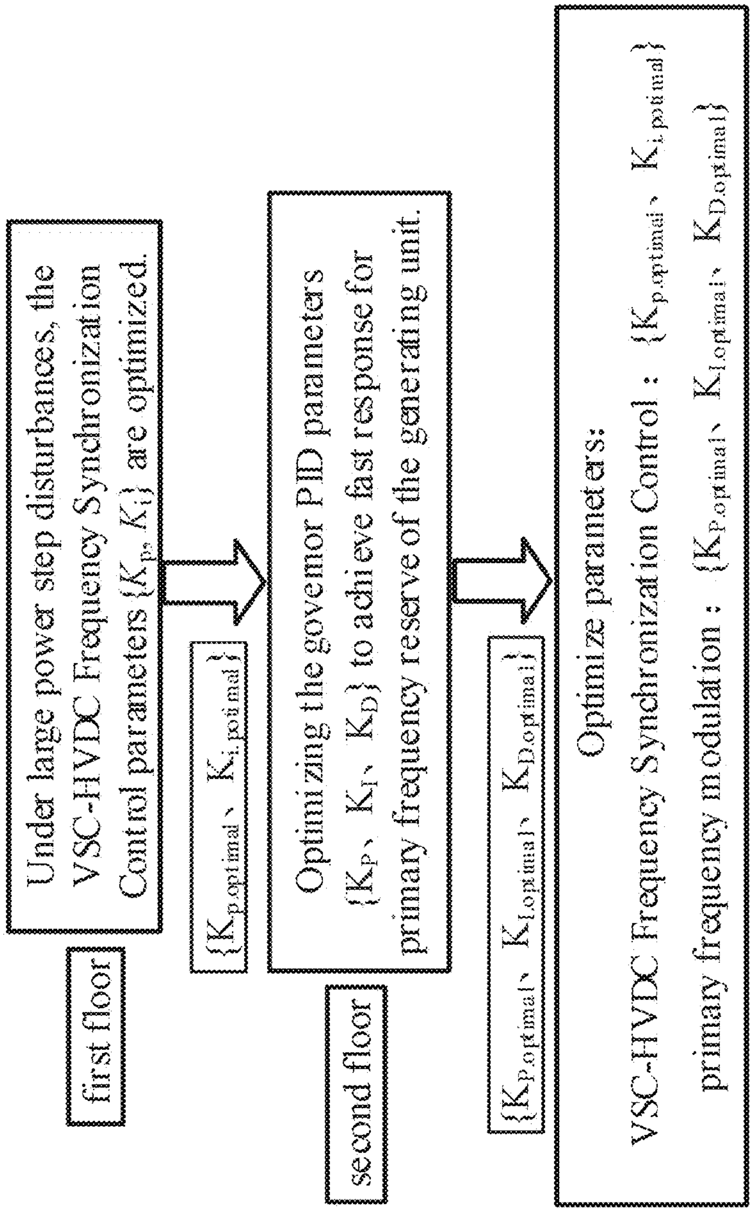
FIG. 6 is a schematic diagram illustrating the framework of the two-layer optimization model for coordinated parameters of VSC-HVDC Frequency Synchronization Control and primary frequency regulation, as related to the embodiments of this application.

Additionally, referring to the schematic framework of the dual-layer optimization model for VSC-HVDC Frequency Synchronization and primary frequency regulation coordination parameters shown in FIG. 6, the first layer of the model uses a large power step disturbance to minimize two integral metrics—the frequency of the sending and receiving end grids and the power regulation amount of frequency synchronization—as the objective function. This layer calculates the target selection range for the $K_p$ and $K_i$ parameters of the frequency synchronization controller.

In the second layer of the model, the objective function is constrained by the fastest activation time for primary frequency reserve of the governor parameters. This layer calculates the PID control parameters corresponding to the hydroelectric primary frequency regulation system.

Additionally, it will be understood by those skilled in the art that all or part of the processes in the methods of the above embodiments can be implemented by instructing relevant hardware through a computer program. This computer program includes program instructions and can be stored on a storage medium, which is a computer-readable storage medium. These program instructions are executed by at least one processor in the power grid frequency regulation system to carry out the process steps of the method embodiments described above.

Therefore, this application also provides a computer-readable storage medium, which stores a coordination optimization program for VSC-HVDC Frequency Synchronization Control and hydroelectric primary frequency regulation. When executed by a processor, this coordination optimization program performs each step of the VSC-HVDC Frequency Synchronization Control and hydroelectric primary frequency regulation coordination optimization method as described in the above embodiments.

The computer-readable storage medium may include various types of media capable of storing program code, such as a USB drive, external hard drive, Read-Only Memory (ROM), magnetic disk, or optical disc.

It should be noted that since the storage medium provided in this application's embodiments is used to implement the methods described in these embodiments, those skilled in the art will understand the specific structure and variations of the storage medium based on the methods presented here. Therefore, further details are not provided. Any storage medium used in the methods of this application's embodiments falls within the scope of protection intended by this application.

Those skilled in the art will understand that the embodiments of this application may be provided as a method, a system, or a computer program product. Thus, this application may be implemented in the form of a completely hardware-based embodiment, a completely software-based embodiment, or an embodiment combining software and hardware aspects. Furthermore, this application can take the form of a computer program product implemented on one or more computer-readable storage media containing computer-usable program code (including, but not limited to, magnetic disk storage, CD-ROM, optical storage, etc.).

This application is described with reference to flowcharts and/or block diagrams of methods, devices (systems), and computer program products according to embodiments of the application. It should be understood that each flow and/or block in the flowcharts and/or block diagrams, as well as combinations of flows and/or blocks, can be implemented by computer program instructions. These computer program instructions may be provided to a processor of a general-purpose computer, a special-purpose computer, an embedded processor, or other programmable data processing device to produce a machine that, when the instructions are executed by the computer or other programmable data processing device, creates means for implementing the functions specified in one or more flows of the flowchart and/or one or more blocks of the block diagram.

These computer program instructions may also be stored in a computer-readable memory that can direct a computer or other programmable data processing device to operate in a specific manner, such that the instructions stored in this computer-readable memory produce an article of manufacture that includes instruction means for implementing the functions specified in one or more flows of the flowchart and/or one or more blocks of the block diagram.

These computer program instructions may also be loaded onto a computer or other programmable data processing device, causing a series of operational steps to be performed on the computer or other programmable device to produce a computer-implemented process. Thus, the instructions executed on the computer or other programmable device provide steps for implementing the functions specified in one or more flows of the flowchart and/or one or more blocks of the block diagram.

It should be noted that in the claims, any reference signs placed in parentheses should not be construed as limiting the claims. The word "comprising" does not exclude the presence of elements or steps not listed in the claims. The word "a" or "an" preceding an element does not exclude the presence of multiple such elements. This application may be implemented by hardware comprising several distinct components, as well as by a suitably programmed computer. In a claim listing several devices, several of these devices may be embodied by the same hardware item. The use of terms such as first, second, and third does not imply any order. These terms may be interpreted as labels.

Although preferred embodiments of this application have been described, those skilled in the art, once aware of the basic inventive concept, may make additional changes and modifications to these embodiments. Therefore, the appended claims are intended to be interpreted as including the preferred embodiments and all changes and modifications that fall within the scope of this application.

It is evident that those skilled in the art may make various changes and modifications to this application without departing from its spirit and scope. Accordingly, if such modifications and variations fall within the scope of the claims of this application and their equivalents, this application is intended to encompass these changes and modifications.

What is claimed is:

1. A coordinated optimization method for VSC-HVDC frequency synchronization control and primary frequency regulation in hydropower, applied to a grid frequency regulation system, wherein the grid frequency regulation system comprises a dual-layer optimization model for coordinated parameters of Voltage Source Converter based High Voltage Direct Current Transmission (VSC-HVDC) Frequency Synchronization and primary frequency regulation, and the coordinated optimization method comprises:

obtaining a target selection range for $K_p$ and $K_i$ parameters of a VSC-HVDC frequency synchronization controller from a first layer output of the dual-layer optimization model for the coordinated parameters of the VSC-HVDC Frequency Synchronization and the primary frequency regulation, wherein a first layer comprises a large power step disturbance scenario, where a first objective function minimizes two integral indices: frequency deviations of sending and receiving grids and a power regulation magnitude of a VSC-HVDC system;

obtaining target Proportional-Integral-Derivative (PID) control parameters from a second layer output of the dual-layer optimization model for the coordinated parameters of the VSC-HVDC Frequency Synchronization and the primary frequency regulation, wherein a second layer comprises a second objective function constrained by a shortest time required for primary frequency reserve activation in governor parameter-controlled generation units; and adjusting a selection range of the $K_p$ and $K_i$ parameters of the VSC-HVDC frequency synchronization controller based on the target selection range, and updating PID control parameters of a hydro power primary frequency regulation system based on the target PID control parameters.

2. The coordinated optimization method according to claim 1, wherein the first objective function is expressed as:

$$\min F_1(x_c) = \int_0^{t_{sim}} \Delta f(t)dt + 10^{\alpha} \int_0^{t_{sim}} \Delta P_{Tp.double}(t)dt$$

wherein $\min F_1(x_c)$ represents the first objective function; $t_{sim}$ denotes a simulation duration; $x_c$ refers to parameters of a VSC-HVDC Frequency Synchronization control loop; $\Delta f_{inv}$ is a sum of frequency deviations for the sending and receiving grids; $\Delta P_{TP.double}$ represents a sum of power regulation values for the VSC-HVDC synchronization at both sending and receiving ends; and $\alpha$ is a scaling factor for adjusting magnitude.

3. The coordinated optimization method according to claim 2, wherein functional expressions of $\Delta f(t)$ and $\Delta P_{TP.double}$ are as follows:

$$\begin{cases} \Delta P_{TP.double} = \Delta P_{TP.rec} - \Delta P_{TP.inv} \\ \Delta f = \Delta f_{rec} + \Delta f_{inv} \end{cases}$$

wherein $\Delta P_{TP.res}$ represents a power regulation amount for a sending-end system, $\Delta P_{TP.inv}$ represents a power regulation amount for a receiving-end system, $\Delta f_{rec}$ denotes a frequency deviation of the sending-end grid, and $\Delta f_{inv}$ denotes a frequency deviation of the receiving-end grid;

functional expressions for $\Delta P_{TP}(t)$ and $\Delta f(t)$ are as follows:

$$\begin{cases} \Delta P_{TP.rec}(t) = k_{TP.rec}(t - t_0) \\ \Delta P_{TP.inv}(t) = k_{TP.inv}(t - t_0) \\ \Delta f_{rec}(t) = \dfrac{k_{TP.rec}}{4H_{sys.rec}}(t - t_0)^2 - \dfrac{P_{lost.rec}}{2H_{sys.rec}}(t - t_0) & t \in (t_0, t_1] \\ \Delta f_{inv}(t) = \dfrac{k_{TP.inv}}{4H_{sys.inv}}(t - t_0)^2 - \dfrac{P_{lost.inv}}{2H_{sys.inv}}(t - t_0) \end{cases}$$

$$\begin{cases} \Delta P_{TP.rec}(t) = k_{TP.rec}(t_P - t_1) = \dfrac{k_{TP.rec}P_{lost.rec}}{k_{TP.rec} + k_{hy.rec}} \\ \Delta P_{TP.inv}(t) = k_{TP.inv}(t_P - t_1) = \dfrac{k_{TP.inv}P_{lost.inv}}{k_{TP.inv} + k_{hy.inv}} \\ \Delta f_{rec}(t) = f_N + \dfrac{k_{TP.rec} + k_{hy.rec}}{4H_{sys.rec}}(t - t_1)^2 - \dfrac{P_{lost.rec}}{2H_{sys.rec}}(t - t_1) & t \in (t_1, t_P] \\ \Delta f_{inv}(t) = f_N + \dfrac{k_{TP.inv} + k_{hy.inv}}{4H_{sys.inv}}(t - t_1)^2 - \dfrac{P_{lost.inv}}{2H_{sys.inv}}(t - t_1) \end{cases}$$

wherein $P_{lost}$ represents an imbalance power, $\Delta P_{TP}$ denotes a VSC-HVDC power regulation amount, $K_{hy}$ is a rate of change of a hydro turbine governor, $H_{sys}$ represents an equivalent system inertia, $k_{TP}$ is an approximate slope of a DC power variation, $f_N$ is a nominal frequency, a subscript rec indicates a sending end, and a subscript in indicates a receiving end.

4. The coordinated optimization method according to claim 1, wherein the first layer further comprises the following constraints:

$$\begin{cases} \text{s.t. } g_1(x_c), g_2(x_c) \\ h(x_{gen}) \end{cases}$$

wherein $g_1(x_c)$ represents a third objective function for initial values of the $K_p$ and $K_i$ parameters, $g_2(x_c)$ is a fourth objective function for the VSC-HVDC power regulation constrained by a rated capacity and transmitted power of the HVDC system, and $h(x_{gen})$ is a fifth objective function representing constraint conditions for hydro power primary frequency regulation units;

wherein $g_1(x_c)$ satisfies the following inequality constraints:

$$\begin{cases} K_{pmin} < K_{p.0} < K_{p.max} \\ K_{imin} < K_{i.0} < K_{i.max} \end{cases}$$

wherein $K_{p.0}$ and $K_{i.0}$ are initial values of PI controller parameters, $K_{p.max}$ and $K_{i.max}$ are maximum values of the PI controller parameters, and $K_{p.min}$ and $K_{i.min}$ are minimum values of the PI controller parameters wherein $g_2(x_c)$ satisfies the following inequality constraints:

$$\begin{cases} 0 < \Delta P_{TP} < \Delta P_{TP.max} \\ \Delta P_{TP.min} < \Delta P_{TP} \le 0 \end{cases}$$

wherein $\Delta P_{TP.max}$ and $\Delta P_{TP.min}$ are upper and lower limits of a VSC-HVDC Frequency Synchronization power regulation amount, respectively;

wherein $h(x_{gen})$ satisfies the following inequality constraints;

$$\begin{cases} T^{r}_{hy.i} < T^{r.max}_{hy.i} \\ P^{min}_{hy.i} < P_{hy.i} < P^{max}_{hy.i} \end{cases}$$

wherein $$T^{r}_{hy\ i}$$

is a power ramp-up time for a hydroelectric unit participating in primary frequency regulation, $$T^{r\ .max}_{hy\ .i}$$

is a maximum ramp-up time specified by guidelines, $$T^{r\ .max}_{hy\ .i}$$

is an output of the hydroelectric unit during primary frequency regulation, and $P_{hy.1}$ and $$P^{min}_{hy,i}$$

are upper and lower limits of the hydroelectric unit's output during primary frequency regulation, respectively.

5. The coordinated optimization method according to claim 1, wherein the second layer further comprises the following constraints:

$$\begin{cases} \min\{t_p\} \\ L(x_g) \end{cases}$$

wherein $\min\{t_p\}$ represents the second objective function, and $L(X_g)$ represents constraint conditions for governor parameters;

wherein $L(X_g)$ satisfies the following inequality constraints:

$$L(x_g) = \begin{cases} K_{Pmin} \le K_P \le K_{Pmax} \\ K_{Dmin} \le K_D \le K_{Dmax} \\ K_{Imin} \le K_I \le K_{Imax} \end{cases}$$

wherein $K_{Pmax}$, $K_{Dmax}$, and $K_{Imax}$ are upper limits of a proportional gain, a derivative gain, and an integral gain of a PID controller in a hydro turbine governor system, respectively; and $K_{Pmin}$, $K_{Dmin}$, and $K_{Imin}$ are lower limits of the proportional gain, derivative gain, and integral gain of the PID controller in the hydro turbine governor system, respectively.

6. The coordinated optimization method according to claim 1, wherein the first layer is optimized based on time-domain simulation analysis results, and the $K_p$ and $K_i$ parameters are optimized using particle swarm optimization.

7. The coordinated optimization method according to claim 1, wherein the second layer is optimized based on an eigenvalue sensitivity optimization method to ensure a fastest step response time for a single machine and a positive damping ratio.

8. The coordinated optimization method according to claim 7, wherein the optimization comprises the following steps:

Step 1: initializing the $K_P$, $K_I$, and $K_D$ parameters in a hydroelectric unit regulation system;

Step 2: based on predefined state-space equations of a turbine and a governor closed-loop system under asynchronous interconnection, solving for a maximum real part of eigenvalues corresponding to the $K_P$, $K_I$, and $K_D$ parameters, as well as respective damping ratios;

Step 3: based on the maximum real part of the eigenvalues and a predefined step size, calculate target $K_P$, $K_I$, and $K_D$ parameters;

Step 4: based on the target $K_P$, $K_I$, and $K_D$ parameters, evaluating whether a dynamic performance of a hydroelectric unit's primary frequency regulation has improved, wherein:

$$F(K^*_{P1}, K^*_{D1}, K^*_{I1}) \le F(K_{P1}, K_{D1}, K_{I1})$$

$$F(K_P, K_D, K_I) = \int_0^{t_f} (x_t - x_\infty)^2 dt$$

$$x_\infty = \lim_{t \to 0}\left(sG_{sys}\frac{1}{s}\right) = \frac{1}{b_p}$$

wherein $x_\infty$ is a steady-state value, $t_f$ is an upper limit of an integration time, $x_t$ is a system output at time t, $G_{sys}(s)$ is an open-loop transfer function of a turbine system, s is a complex variable, and $b_p$ is a steady-state gain coefficient;

Step 5: if yes, repeat Steps S2 to S4 until a damping ratio is less than a predefined damping ratio threshold or a number of iterations reaches a predefined iteration threshold; and Step 6: output current target $K_P$, $K_I$, and $K_D$ parameters as the target PID control parameters.

9. A grid frequency regulation system, comprising a memory, a processor, and a coordinated optimization program for VSC-HVDC frequency synchronization control and primary frequency regulation of hydropower stored on the memory and executable on the processor, wherein when executed by the processor, the coordinated optimization program implements steps of the coordinated optimization method according to claim 1.

10. A computer-readable storage medium, storing a coordinated optimization program for VSC-HVDC frequency synchronization control and primary frequency regulation of hydropower, wherein when executed by a processor, the coordinated optimization program implements steps of the coordinated optimization method according to claim 1.

11. The coordinated optimization method according to claim 2, wherein the first layer further comprises the following constraints:

$$\begin{cases} \text{s.t.}\, g_1(x_c),\ g_2(x_c) \\ h(x_{gen}) \end{cases}$$

wherein $g_1(x_c)$ represents a third objective function for initial values of the $K_p$ and $K_i$ parameters, $g_2(x_c)$ is a fourth objective function for the VSC-HVDC power regulation constrained by a rated capacity and transmitted power of the HVDC system, and $h(x_{gen})$ is a fifth objective function representing constraint conditions for hydro power primary frequency regulation units;

wherein $g_1(x_c)$ satisfies the following inequality constraints:

$$\begin{cases} K_{p.min} < K_{p.0} < K_{p.max} \\ K_{i.min} < K_{i.0} < K_{i.max} \end{cases}$$

wherein $K_{p.0}$ and $K_{i.0}$ are initial values of PI controller parameters, $K_{p.max}$ and $K_{i.max}$ are maximum values of the PI controller parameters, and $K_{p.min}$ and $K_{i.min}$ are minimum values of the PI controller parameters wherein $g_2(x_c)$ satisfies the following inequality constraints:

$$\begin{cases} 0 < \Delta P_{TP} < \Delta P_{TP.max} \\ \Delta P_{TP.min} < \Delta P_{TP} \le 0 \end{cases}$$

wherein $\Delta P_{TP.max}$ and $\Delta P_{TP.min}$ are upper and lower limits of a VSC-HVDC Frequency Synchronization power regulation amount, respectively;

wherein $h(x_{gen})$ satisfies the following inequality constraints:

$$\begin{cases} T_{hy.i}^{r} < T_{hy.i}^{r.max} \\ P_{hy.i}^{min} < P_{hy.i} < P_{hy.i}^{max} \end{cases}$$

wherein $$T_{hy.i}^{r}$$

is a power ramp-up time for a hydroelectric unit participating in primary frequency regulation, $$T_{hy.i}^{r.max}$$

is a maximum ramp-up time specified by guidelines, $$T_{hy.i}^{r.max}$$

is an output of the hydroelectric unit during primary frequency regulation, and $P_{hy.i}$ $$\text{and } P_{hy.i}^{min}$$

are upper and lower limits of the hydroelectric unit's output during primary frequency regulation, respectively.

12. The grid frequency regulation system according to claim 9, wherein in the coordinated optimization method, the first objective function is expressed as:

$$\min F_1(x_c) = \int_0^{t_{sim}} \Delta f(t)dt + 10^{\alpha} \int_0^{t_{sim}} \Delta P_{Tp.double}(t)dt$$

wherein $\min F_1(x_c)$ represents the first objective function; $t_{sim}$ denotes a simulation duration; $x_c$ refers to parameters of a VSC-HVDC Frequency Synchronization control loop; $\Delta f_{inv}$ is a sum of frequency deviations for the sending and receiving grids; $\Delta P_{TP.double}$ represents a sum of power regulation values for the VSC-HVDC synchronization at both sending and receiving ends; and $\alpha$ is a scaling factor for adjusting magnitude.

13. The grid frequency regulation system according to claim 12, wherein functional expressions of $\Delta f(t)$ and $\Delta P_{TP.double}$ are as follows:

$$\begin{cases} \Delta P_{Tp.double} = \Delta P_{TP.rec} - \Delta P_{TP.inv} \\ \Delta f = \Delta f_{rec} + \Delta f_{inv} \end{cases}$$

wherein $\Delta P_{TP.rec}$ represents a power regulation amount for a sending-end system, $\Delta P_{TP.inv}$ represents a power regulation amount for a receiving-end system, $\Delta f_{rec}$ denotes a frequency deviation of the sending-end grid, and $\Delta f_{inv}$ denotes a frequency deviation of the receiving-end grid;

functional expressions for $\Delta P_{TP}(t)$ and $\Delta f(t)$ are as follows:

$$\begin{cases} \Delta P_{TP,rec}(t) = k_{TP,rec}(t - t_0) \\ \Delta P_{TP,inv}(t) = k_{TP,inv}(t - t_0) \\ \Delta f_{rec}(t) = \frac{k_{TP,rec}}{4H_{sys,rec}}(t - t_0)^2 - \frac{P_{lost,rec}}{2H_{sys,rec}}(t - t_0) t \in (t_0, t_1] \\ \Delta f_{inv}(t) = \frac{k_{TP,inv}}{4H_{sys,inv}}(t - t_0)^2 - \frac{P_{lost,inv}}{2H_{sys,inv}}(t - t_0) \end{cases}$$

$$\begin{cases} \Delta P_{TP,rec}(t) = k_{TP,rec}(t_P - t_1) = \frac{k_{TP,rec} P_{lost,rec}}{k_{TP,rec} + k_{hy,rec}} \\ \Delta P_{TP,inv}(t) = k_{TP,inv}(t_P - t_1) = \frac{k_{TP,inv} P_{lost,inv}}{k_{TP,inv} + k_{hy,inv}} \\ \Delta f_{rec}(t) = f_N + \frac{k_{TP,rec} + k_{hy,rec}}{4H_{sys,rec}}(t - t_1)^2 - \frac{P_{lost,rec}}{2H_{sys,rec}}(t - t_1) t \in (t_1, t_P] \\ \Delta f_{inv}(t) = f_N + \frac{k_{TP,inv} + k_{hy,inv}}{4H_{sys,inv}}(t - t_1)^2 - \frac{P_{lost,inv}}{2H_{sys,inv}}(t - t_1) \end{cases}$$

wherein $P_{lost}$ represents an imbalance power, $\Delta P_{TP}$ denotes a VSC-HVDC power regulation amount, $K_{hy}$ is a rate of change of a hydro turbine governor, $H_{sys}$ represents an equivalent system inertia, $k_{TP}$ is an approximate slope of a DC power variation, $f_N$ is a nominal frequency, a subscript rec indicates a sending end, and a subscript in indicates a receiving end.

14. The grid frequency regulation system according to claim 9, wherein in the coordinated optimization method, the first layer further comprises the following constraints:

$$\begin{cases} \text{s.t. } g_1(x_c), g_2(x_c) \\ h(x_{gen}) \end{cases}$$

wherein $g_1(x_c)$ represents a third objective function for initial values of the $K_p$ and $K_i$ parameters, $g_2(x_c)$ is a fourth objective function for the VSC-HVDC power regulation constrained by a rated capacity and transmitted power of the HVDC system, and $h(x_{gen})$ is a fifth objective function representing constraint conditions for hydro power primary frequency regulation units, wherein $g_1(x_c)$ satisfies the following inequality constraints:

$$\begin{cases} K_{p,min} < K_{p,0} < K_{p,max} \\ K_{i,min} < K_{i,0} < K_{i,max} \end{cases}$$

wherein $K_{p.0}$ and $K_{i.0}$ are initial values of PI controller parameters, $K_{p.max}$ and $K_{i.max}$ are maximum values of the PI controller parameters, and $K_{p.min}$ and $K_{i.min}$ are minimum values of the PI controller parameters, wherein $g_2(x_c)$ satisfies the following inequality constraints:

$$\begin{cases} 0 < \Delta P_{TP} < \Delta P_{TP,max} \\ \Delta P_{TP,min} < \Delta P_{TP} \leq 0 \end{cases}$$

wherein $\Delta P_{TP.max}$ and $\Delta P_{TP.min}$ are upper and lower limits of a VSC-HVDC Frequency Synchronization power regulation amount, respectively;

wherein $h(x_{gen})$ satisfies the following inequality constraints:

$$\begin{cases} T^{r}_{hy,i} < T^{r,max}_{hy,i} \\ T^{min}_{hy,i} < P_{hy,i} < T^{max}_{hy,i} \end{cases}$$

wherein $$T^{r}_{hy,i}$$

is a power ramp-up time for a hydroelectric unit participating in primary frequency regulation, $$T^{r,max}_{hy,i}$$

is a maximum ramp-up time specified by guidelines, $$T^{r,max}_{hy,i}$$

is an output of the hydroelectric unit during primary frequency regulation, and $P_{hy.i}$ and $$P^{min}_{hy,i}$$

are upper and lower limits of the hydroelectric unit's output during primary frequency regulation, respectively.

15. The grid frequency regulation system according to claim 9, wherein in the coordinated optimization method, the second layer further comprises the following constraints:

$$\begin{cases} \min\{t_p\} \\ L(x_g) \end{cases}$$

wherein $\min\{t_p\}$ represents the second objective function, and $L(X_g)$ represents constraint conditions for governor parameters;

wherein $L(X_g)$ satisfies the following inequality constraints:

$$L(x_g) = \begin{cases} K_{Pmin} \leq K_P \leq K_{Pmax} \\ K_{Dmin} \leq K_D \leq K_{Dmax} \\ K_{Imin} \leq K_I \leq K_{Imax} \end{cases}$$

wherein $K_{Pmax}$, $K_{Dmax}$, and $K_{Imax}$ are upper limits of a proportional gain, a derivative gain, and an integral gain of a PID controller in a hydro turbine governor system, respectively; and $K_{Pmin}$, $K_{Dmin}$, and $K_{Imin}$, are lower limits of the proportional gain, derivative gain, and integral gain of the PID controller in the hydro turbine governor system, respectively.

16. The grid frequency regulation system according to claim 9, wherein in the coordinated optimization method, the first layer is optimized based on time-domain simulation analysis results, and the $K_p$ and $K_i$ parameters are optimized using particle swarm optimization.

17. The grid frequency regulation system according to claim 9, wherein in the coordinated optimization method, the second layer is optimized based on an eigenvalue sensitivity optimization method to ensure a fastest step response time for a single machine and a positive damping ratio.

18. The grid frequency regulation system according to claim 17, wherein the optimization comprises the following steps:

Step 1: initializing the $K_P$, $K_I$, and $K_D$ parameters in a hydroelectric unit regulation system;

Step 2: based on predefined state-space equations of a turbine and a governor closed-loop system under asynchronous interconnection, solving for a maximum real part of eigenvalues corresponding to the $K_P$, $K_I$, and $K_D$ parameters, as well as respective damping ratios;

Step 3: based on the maximum real part of the eigenvalues and a predefined step size, calculate target $K_P$, $K_I$, and $K_D$ parameters;

Step 4: based on the target $K_P$, $K_I$, and $K_D$ parameters, evaluating whether a dynamic performance of a hydroelectric unit's primary frequency regulation has improved, wherein:

$$F(K^{*}_{P1}, K^{*}_{D1}, K^{*}_{I1}) = \leq F(K_{P1}, K_{D1}, K_{I1})$$

$$F(K_P, K_D, K_I) = \int_0^{t_f} (x_t - x_\infty)^2 dt$$

$$x_\infty = \lim_{t \to 0}\left(sG_{sys}\frac{1}{s}\right) = \frac{1}{b_p}$$

wherein $x_\infty$ is a steady-state value, $t_f$ is an upper limit of an integration time, $x_t$ is a system output at time t, $G_{sys}(s)$ is an open-loop transfer function of a turbine system, s is a complex variable, and $b_p$ is a steady-state gain coefficient;

Step 5: if yes, repeat Steps S2 to S4 until a damping ratio is less than a predefined damping ratio threshold or a number of iterations reaches a predefined iteration threshold; and Step 6: output current target $K_P$, $K_I$, and $K_D$ parameters as the target PID control parameters.

19. The computer-readable storage medium according to claim 10, wherein in the coordinated optimization method, the first objective function is expressed as:

$$\min F_1(x_c) = \int_0^{t_{sim}} \Delta f(t)dt + 10^{\alpha} \int_0^{t_{sim}} \Delta P_{TP,double}(t)dt$$

wherein $\min F_1(x_c)$ represents the first objective function; $t_{sim}$ denotes a simulation duration; $x_c$ refers to parameters of a VSC-HVDC Frequency Synchronization control loop; $\Delta f_{inv}$ is a sum of frequency deviations for the sending and receiving grids; $\Delta P_{TP.double}$ represents a sum of power regulation values for the VSC-HVDC synchronization at both sending and receiving ends; and $\alpha$ is a scaling factor for adjusting magnitude.

20. The computer-readable storage medium according to claim 19, wherein functional expressions of $\Delta f(t)$ and $\Delta P_{TP.double}$ are as follows:

$$\begin{cases} \Delta P_{TP,double} = \Delta P_{TP,rec} - \Delta P_{TP,inv} \\ \Delta f = \Delta f_{rec} + \Delta f_{inv} \end{cases}$$

wherein $\Delta P_{TP.rec}$ represents a power regulation amount for a sending-end system, $\Delta P_{TP.inv}$ represents a power regulation amount for a receiving-end system, $\Delta f_{rec}$ denotes a frequency deviation of the sending-end grid, and $\Delta f_{inv}$ denotes a frequency deviation of the receiving-end grid;

functional expressions for $\Delta P_{TP}(t)$ and $\Delta f(t)$ are as follows:

$$\begin{cases} \Delta P_{TP,rec}(t) = k_{TP,rec}(t - t_0) \\ \Delta P_{TP,inv}(t) = k_{TP,inv}(t - t_0) \\ \Delta f_{rec}(t) = \dfrac{k_{TP,rec}}{4H_{sys,rec}}(t - t_0)^2 - \dfrac{P_{lost,rec}}{2H_{sys,rec}}(t - t_0) t \in (t_0, t_1] \\ \Delta f_{inv}(t) = \dfrac{k_{TP,inv}}{4H_{sys,inv}}(t - t_0)^2 - \dfrac{P_{lost,inv}}{2H_{sys,inv}}(t - t_0) \end{cases}$$

$$\begin{cases} \Delta P_{TP,rec}(t) = k_{TP,rec}(t_P - t_1) = \dfrac{k_{TP,rec} P_{lost,rec}}{k_{TP,rec} + k_{hy,rec}} \\ \Delta P_{TP,inv}(t) = k_{TP,inv}(t_P - t_1) = \dfrac{k_{TP,inv} P_{lost,inv}}{k_{TP,inv} + k_{hy,inv}} \\ \Delta f_{rec}(t) = f_N + \dfrac{k_{TP,rec} + k_{hy,rec}}{4H_{sys,rec}}(t - t_1)^2 - \dfrac{P_{lost,rec}}{2H_{sys,rec}}(t - t_1) t \in (t_1, t_P] \\ \Delta f_{inv}(t) = f_N + \dfrac{k_{TP,inv} + k_{hy,inv}}{4H_{sys,inv}}(t - t_1)^2 - \dfrac{P_{lost,inv}}{2H_{sys,inv}}(t - t_1) \end{cases}$$

wherein $P_{lost}$ represents an imbalance power, $\Delta P_{TP}$ denotes a VSC-HVDC power regulation amount, $K_{hy}$ is a rate of change of a hydro turbine governor, $H_{sys}$ represents an equivalent system inertia, $k_{TP}$ is an approximate slope of a DC power variation, $f_N$ is a nominal frequency, a subscript rec indicates a sending end, and a subscript in indicates a receiving end.

* * * * *